(12) United States Patent
Ogo et al.

(10) Patent No.: US 9,022,585 B2
(45) Date of Patent: May 5, 2015

(54) PLASTIC LENS

(75) Inventors: Yoichi Ogo, Shinjuku-ku (JP); Koushi Harada, Shinjuku-ku (JP); Kenji Nakamura, Shinjuku-ku (JP)

(73) Assignee: Hoya Corporation, Tokyo (JP)

(*) Notice: Subject to any disclaimer, the term of this patent is extended or adjusted under 35 U.S.C. 154(b) by 0 days.

(21) Appl. No.: 14/007,502

(22) PCT Filed: Mar. 23, 2012

(86) PCT No.: PCT/JP2012/057573
§ 371 (c)(1),
(2), (4) Date: Nov. 14, 2013

(87) PCT Pub. No.: WO2012/133216
PCT Pub. Date: Oct. 4, 2012

(65) Prior Publication Data
US 2014/0063608 A1 Mar. 6, 2014

(30) Foreign Application Priority Data

Mar. 25, 2011 (JP) ................................. 2011-068611

(51) Int. Cl.
| | | |
|---|---|---|
| *G02B 1/11* | (2006.01) | |
| *G02C 7/02* | (2006.01) | |
| *G02B 3/00* | (2006.01) | |

(52) U.S. Cl.
CPC *G02B 1/113* (2013.01); *G02B 1/11* (2013.01); *G02C 7/02* (2013.01); *G02B 3/00* (2013.01); *G02B 1/116* (2013.01)

(58) Field of Classification Search
CPC .... G02B 5/0278; G02B 5/0273; G02B 1/105; G02B 1/11; G02B 1/113; G02B 1/115; G02B 1/116; G02F 1/1525; B32B 27/00; B32B 27/08
USPC ............... 359/270, 273, 601; 428/411.1, 412; 427/162, 164
See application file for complete search history.

(56) References Cited

U.S. PATENT DOCUMENTS

| | | |
|---|---|---|
| 6,104,534 A | 8/2000 | Ohta et al. |
| 2001/0000331 A1* | 4/2001 | Ram et al. .................. 428/423.1 |
| 2002/0008018 A1 | 1/2002 | Murayama et al. |
| 2008/0023138 A1* | 1/2008 | Zheng .......................... 156/344 |

FOREIGN PATENT DOCUMENTS

| | | |
|---|---|---|
| JP | A 60-156001 | 8/1985 |
| JP | A 6-138303 | 5/1994 |
| JP | A 6-208002 | 7/1994 |

(Continued)

OTHER PUBLICATIONS

May 1, 2012 Search Report issued in International Patent Application No. PCT/JP2012/057573 (with translation).

*Primary Examiner* — Suchin Parihar
*Assistant Examiner* — William R Alexander
(74) *Attorney, Agent, or Firm* — Oliff PLC

(57) ABSTRACT

The disclosure includes producing a plastic lens with an antireflection film at a lower cost. The plastic lens is configured to include a plastic base material; and an antireflection film having an electrically conductive layer that is formed in contact with a surface of the plastic base material and that has colorless transparency, and an antireflection film main body that contains a metal oxide, formed on the electrically conductive layer.

12 Claims, 2 Drawing Sheets

(56) References Cited

FOREIGN PATENT DOCUMENTS

| | | |
|---|---|---|
| JP | A 11-73119 | 3/1999 |
| JP | A 2001-295032 | 10/2001 |
| JP | A 2003-206363 | 7/2003 |
| JP | A 2006-138896 | 6/2006 |
| JP | A 2007-271860 | 10/2007 |
| WO | WO 01/55752 A1 | 8/2001 |
| WO | 2005059600 A1 | 6/2005 |

* cited by examiner

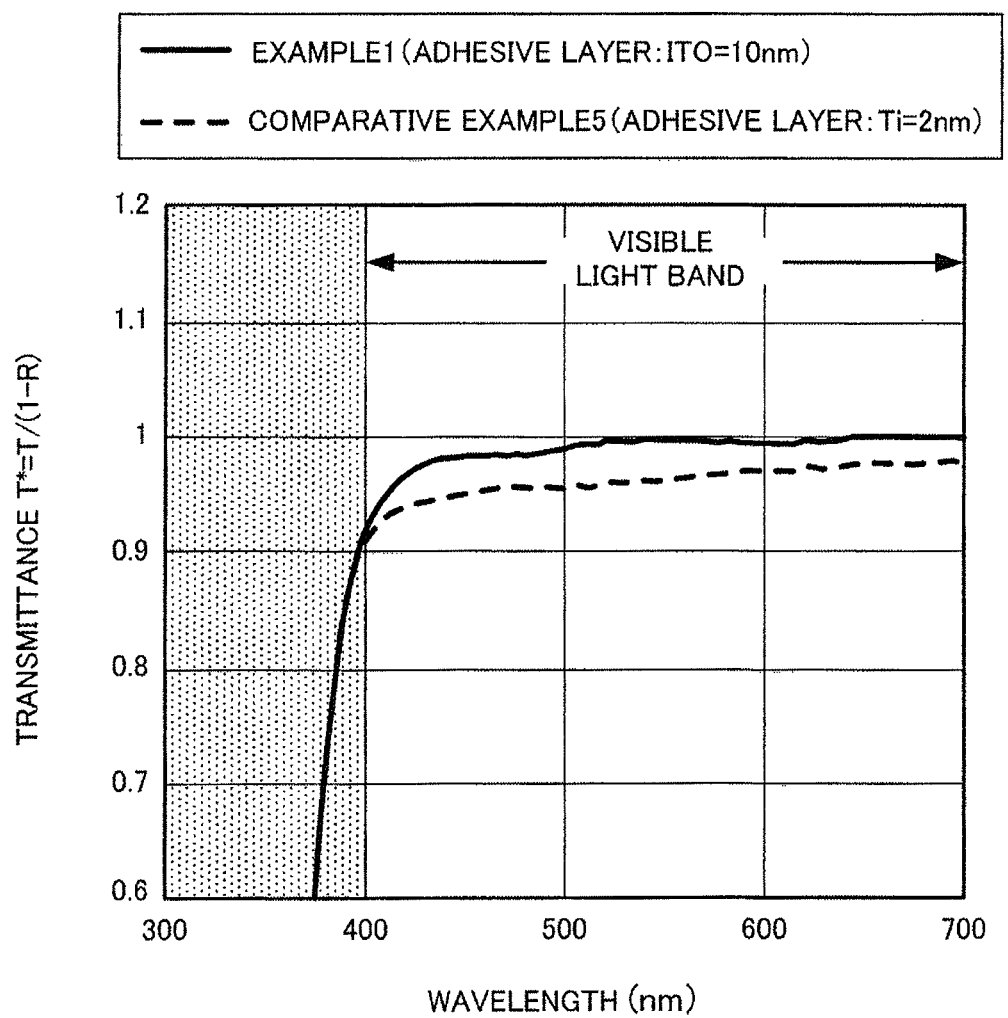

PLASTIC LENS

TECHNICAL FIELD

The present invention relates to a plastic lens for use in, for example, glasses and the like.

BACKGROUND ART

Conventionally, on the surface of a spectacle lens, in order to enhance transmittance and to obtain a clear field of vision, an antireflection film made of a multilayer film of dielectric layers is formed. Since a spectacle lens has a purpose of vision correction, it is used under various circumstances different in conditions such as, for example, temperature, humidity, the inside of a building, and the outside of a building. Therefore, characteristics of the antireflection film are also required not to change under such various use environments.

However, in recent years, the mainstream of raw material of a spectacle lens has moved from an inorganic glass to a plastic raw material that is lightweight and is not easily broken, and it is not easy to maintain adhesiveness between a plastic base material being an organic material and an antireflection film containing an inorganic dielectric substance.

Specifically, plastic base materials have a feature of low melting temperature and low thermal deformation temperature. In addition, plastic base materials have a problem of gas emission from the inside thereof. Accordingly, it is not possible to perform a heating treatment of a base material, also on a plastic base material, at a temperature of 300° C. to 400° C., which is performed in the formation of an evaporation film on a base material made of inorganic glass. If a heating treatment at a temperature of 300° C. to 400° C. is possible also for a plastic base material, the formation of an antireflection film excellent in adhesiveness and durability is possible on the plastic base material, but since there are above-mentioned feature, problems and the like, conventionally, an antireflection film is formed on a plastic base material at a low temperature of not higher than 60° C. to 80° C. Consequently, the adhesive force of the antireflection film for the plastic base material and the durability thereof are low.

Therefore, conventionally, in order to solve the above-mentioned problems of the antireflection film, various technologies are proposed (see, for example, Patent Literatures 1 to 3). In Patent Literatures 1 to 3, there are proposed technologies of forming an antireflection film with good adhesiveness directly on a plastic base material, and in Patent Literature 1, there is proposed a technique of providing a metal film, as an adhesive layer, at a first layer of an antireflection film on the base material side and forming an antireflection film made of a dielectric layer on the metal film. In addition, in Patent Literature 2, there is proposed a technique of forming a chromium oxide film as an adhesive layer, and after that, forming an antireflection film on the adhesive layer. Furthermore, in Patent Literature 3, there is proposed a technique of forming a silicon monoxide film as an adhesive layer, and after that, forming an antireflection film on the adhesive layer. Plastic lenses manufactured by techniques described in the above-mentioned Patent Literatures 1 to 3 are used mainly as an optical lens built in a camera and the like.

However, each of materials of adhesive layers used in the above-mentioned Patent Literatures 1 to 3 is a colored material having an absorption band in visible light. Therefore, the application of antireflection films proposed in the above-mentioned Patent Literatures 1 to 3 to spectacle lenses, for which visual transparency (being colorless and transparent) is required, is difficult. Therefore, conventionally, in spectacle lenses, the coating of a hard coat material containing $SiO_2$ sol on a plastic base material forms a hard coat layer, and on the hard coat layer, an antireflection film is formed (for example, see Patent Literature 4).

In addition, conventionally, in order to enhance weather resistance and adhesiveness of an antireflection film, a technology of forming a foundation layer containing $Al_2O_3$ on a plastic substrate with a hard coat, and furthermore, forming an antireflection film on the foundation layer is also proposed (for example, see Patent Literature 5).

CITATION LIST

Patent Literature

PTL 1: Japanese Patent Laid-Open No. 60-156001
PTL 2: Japanese Patent Laid-Open No. 06-138303
PTL 3: Japanese Patent Laid-Open No. 06-208002
PTL 4: Japanese Patent Laid-Open No. 2003-206363
PTL 5: Japanese Patent Laid-Open No. 2007-271860

SUMMARY OF INVENTION

Technical Problem

As described above, conventionally, plastic lenses with an antireflection film formed on a plastic base material are variously proposed, but in this technological field, in particular, in the field of spectacle lenses, there is desired development of technology enabling plastic lenses with an antireflection film to be manufactured at a lower cost.

The present invention has been achieved in order to respond to the above-mentioned request, and a purpose of the present invention is to produce a plastic lens with an antireflection film at a lower cost.

Solution to Problem

In order to solve the above-mentioned problem, the plastic lens of the present invention includes a plastic base material; and an antireflection film having an electrically conductive layer that is formed in contact with a surface of the plastic base material and that has colorless transparency, and an antireflection film main body that contains a metal oxide, formed on the electrically conductive layer.

Advantageous Effects of Invention

As described above, in the plastic lens of the present invention, an electrically conductive layer having colorless transparency is formed on the contact surface of an antireflection film on the plastic base material side, and thus the adhesiveness and durability of the interface between the plastic base material and the antireflection film is enhanced. Therefore, according to the present invention, since the provision of a hard coat is unnecessary, a plastic lens with an antireflection film can be produced at a lower cost.

BRIEF DESCRIPTION OF DRAWINGS

FIG. 3 is a drawing showing transmittance characteristics in the visible light band in plastic lenses in Example 1 and Comparative Example 5.

DESCRIPTION OF EMBODIMENTS

Figure 1:
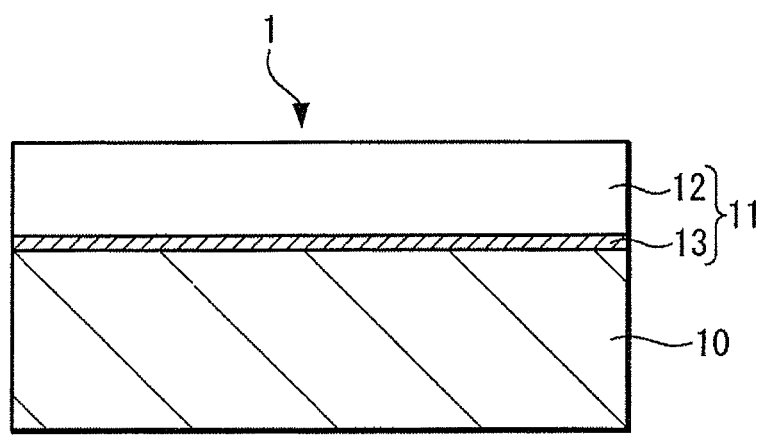
FIG. 1 is a schematic cross-sectional view showing the basic configuration of the plastic lens according to an embodiment of the present invention.

Hereinafter, a configuration example of the plastic lens according to an embodiment of the present invention will be described in order below while referring to the drawings. However, the present invention is not limited to examples below.

1. Basic configuration examples of plastic lenses
2. Various Examples and evaluation results <1. Basic Configuration Examples of Plastic Lenses>
[Cause of Film Peeling and Suppression Principle Thereof]

As described above, in conventional spectacle lenses, an antireflection film is formed not directly on a plastic base material, but an antireflection film is formed on a plastic base material via a hard coat layer in which inorganic sol is dispersed in an organic resin. The reason why a hard coat layer is used is, as described above, to enhance the adhesiveness and durability at the interface between the plastic base material and the antireflection film and to satisfy product specifications of plastic lenses.

When the hard coat layer is provided as described above, a process of coating the hard coat layer on the plastic base material is added, and thus the manufacturing cost is raised. Therefore, in order to manufacture plastic lenses at a lower cost, it is desirable that no hard coat layer be provided.

However, as described above, it is not easy to maintain the adhesiveness between a plastic base material formed of an organic material and an antireflection film formed of an inorganic dielectric material. In fact, as described later, according to an evaluation test (accelerated weathering test) by the present inventors, when an antireflection film is formed directly on a plastic base material without providing a hard coat layer, film peeling of the antireflection film was observed remarkably by an ultraviolet irradiation treatment.

As the cause of the film peeling of the antireflection film generated by ultraviolet irradiation, for example, the following cause is considered.

Since the film peeling of the antireflection film is generated, mainly after the ultraviolet irradiation, the cause thereof is considered to be due to polarized charges generated in the plastic base material, in particular near the surface by irradiating the plastic lens with ultraviolet light.

Since an antireflection film is formed of a dielectric material having a wide forbidden band width, ultraviolet light reaches the plastic base material. In addition, in the plastic base material (base material polymer) having absorbed the ultraviolet light, local polarization is generated by the light energy. Consequently, to the interface between the plastic base material and the antireflection film on which only weak adhesive force caused by intermolecular force acts before the ultraviolet irradiation, there is added electrostatic force caused by the polarization on the plastic base material side due to the ultraviolet irradiation. As a result, it is considered that, at the time of the ultraviolet irradiation, the breaking of the bond at the interface between the plastic base material and the antireflection film, by the electrostatic force added to the interface between the plastic base material and the antireflection film, generates the film peeling.

Meanwhile, when a hard coat layer is provided between the plastic base material and the antireflection film, the hard coat layer contains an inorganic sol (mainly, $SiO_2$ sol). Therefore, it is considered that, at the interface between the antireflection film and the hard coat layer (organic-inorganic interface), ionic bond-like attractive force between inorganic-inorganic materials in addition to the intermolecular force acts and thus strong adhesive force is obtained at the interface of both.

From the above consideration, in the present invention, in order to suppress the peeling of the antireflection film generated when the antireflection film is formed directly on the plastic base material, local polarization generated when the plastic base material absorbs ultraviolet light is eliminated or relaxed.

Specifically, since the plastic base material is generally formed of an insulating polymer, the material has a property in which, once polarization has been generated, deviation of the charges hardly disappears. Therefore, in the present invention, in order to eliminate or relax quickly the polarization in the plastic base material, in particular, local polarization (deviation of charges) generated near the surface of the plastic base material, an electrically conductive film is formed on the surface of the antireflection film on the plastic base material side. However, as the electrically conductive film, in order to ensure colorless transparency of the plastic lens, an electrically conductive film having colorless transparency (transparent electrically conductive film) is used.

That is, in the present invention, it is configured such that a transparent electrically conductive film is formed on the contact surface of the antireflection film with the plastic base material, and that, through the utilization of the electrically conductive property of the transparent electrically conductive film, the deviation of charges generated near the surface of the plastic base material is returned to the original state. Consequently, in the present invention, the adhesiveness between the plastic base material and the antireflection film is improved.

[Basic Configuration of Plastic Lens]

In FIG. 1, there is shown the basic configuration of the plastic lens according to an embodiment of the present invention. Meanwhile, FIG. 1 is a schematic cross-sectional view of the plastic lens of the present embodiment, and in FIG. 1, for simplification of the explanation, there is shown a schematic cross-section of a part of the plastic lens.

The plastic lens 1 includes a base material 10 (plastic base material), and an antireflection film 11 formed in contact with the base material 10.

The base material 10 is constituted by a plastic base material conventionally utilized in plastic lenses such as spectacle lenses. Specifically, the base material 10 can be formed of a resin material such as, for example, allyl resin, urethane resin, polysulfide resin or polycarbonate resin. Furthermore, the base material 10 may be formed of a material such as cycloolefin polymer/cyclic olefin copolymer (COP/COC) or PMMA (Polymethyl methacrylate).

The antireflection film 11 has an antireflection film main body 12 and an electrically conductive layer 13 formed on the surface of the antireflection film main body 12 on the base material 10 side. Meanwhile, in the present embodiment, the electrically conductive layer 13 acts as an adhesive layer for causing the antireflection film main body 12 and the base material 10 to adhere to each other.

The antireflection film main body 12 is constituted by a multilayer film of inorganic dielectric material (metal oxide) layers. For example, the antireflection film main body 12 can be constituted by a multilayer film of a $SiO_2$ layer and a $ZrO_2$ layer being stuck alternately.

The electrically conductive layer 13 constituted by an electrically conductive film having colorless transparency (transparent electrically conductive film). Meanwhile, the electrically conductive layer 13 can be formed of any material only if it is a material having colorless transparency and electroconductivity. For example, the electrically conductive layer 13 can be constituted by an ITO (Indium Tin Oxide) film containing $In_2O_3$ and $SnO_2$. Furthermore, the electrically conductive layer 13 can be constituted by a transparent electrically conductive film containing an oxide of at least one element among In (indium), Sn (tin), Zn (zinc) and Ti (titanium). In addition, the thickness of the electrically conductive layer 13 may be set to be, for example, approximately 10 to 30 nm.

<2. Various Embodiments and Evaluation Results

Next, there will be explained the configuration of the plastic lens 1 in various Examples produced in the present embodiment and an evaluation test of adhesiveness performed on the plastic lenses 1 in various Examples.

EXAMPLE 1 AND EVALUATION TEST 1

(1) Configuration of Plastic Lens in Example 1

In Example 1, plastic lenses 1 were produced using various base materials 10 different in refractive indices. Specifically, various plastic lenses 1 in Example 1 were produced as described below.

In Example 1, first, five kinds of base materials 10 each having a refractive index of 1.50, 1.55, 1.60, 1.67 or 1.70 were prepared.

Next, prepared various base materials 10 were cleaned with a washing machine. Specifically, first, with a weakly alkaline detergent (pH: up to about 9.5), ultrasonic cleaning of various base material 10 was performed for 1 min. Next, with pure water, ultrasonic cleaning of various base materials 10 was performed to remove the detergent, and then, various base materials were dried.

After that, on various base materials 10 cleaned by the above-mentioned cleaning process, an ITO film having a thickness of approximately 10 nm was formed by a vacuum evaporation method and the electrically conductive layer 13 was formed. Then, on the electrically conductive layer 13, each of seven $SiO_2$ layers and each of seven $ZrO_2$ layers were stuck alternately by a vacuum evaporation method and the antireflection film main body 12 was formed. In Example 1, in this way, the antireflection film 11 was formed on various base materials 10.

Meanwhile, in this example, in a state where the electrically conductive layer 13 (ITO film) was formed on the base material 10, the surface resistance (surface electric resistance) of the electrically conductive layer 13 was measured. Specifically, on the electrically conductive layer 13, electrodes were formed with metal paste, and then the surface resistance of the electrically conductive layer 13 was measured using a digital multimeter CD800a (manufactured by Sanwa). In addition, on high-resistance samples having a resistance value of not less than 10 MΩ, resistance measurement was performed using a resistivity meter for high resistance MCP-HT450 (manufactured by Mitsubishi Chemical Analytech Co., Ltd.). As a result, the surface resistance of the electrically conductive layer 13 was approximately $1 \times 10^4 \Omega$.

(2) Evaluation Test 1

In an evaluation test 1, there were evaluated the adhesive force and durability (ultraviolet ray durability) of the antireflection film 11 in various plastic lenses 1 in Example 1 produced as described above. Specifically, by using an accelerated weathering test machine QUV of an ultraviolet fluorescent lamp type (manufactured by Q-Lab Corporation), an accelerated treatment (accelerated weathering test) of a predetermined time period (40 hours or 168 hours in this example) was performed on the above-mentioned various plastic lenses 1, and the adhesive force of the antireflection film 11 for the base material 10 before and after the treatment was evaluated.

Meanwhile, the accelerated weathering test machine QUV used in the evaluation test 1 is a worldwide standard machine of weathering machines, and the test is an accelerated test of weather resistance corresponding to major domestic and international standards such as, for example, JIS, ISO and ASTM. Furthermore, in this example, as an ultraviolet lamp for use in the accelerated test, through the use of a lamp UVA-340 (manufactured by Q-Lab Corporation) that reproduces, with good accuracy, the ultraviolet spectrum of sunlight, the illumination intensity is set to be 0.2 W/m². In addition, in the accelerated weathering test of this example, in a state where respective plastic lenses 1 were left in a container kept at 45° C. in the accelerated weathering test machine QUV, an ultraviolet irradiation treatment and a humidification treatment of humidity 90% were repeated every 4 hours.

Furthermore, in the evaluation test 1, the evaluation of adhesive force of the antireflection film 11 to the base material 10 was performed by a crosshatch test. Specifically, in a part of the surface of the plastic lens 1 on the antireflection film 11 side, a lattice-shaped notch was formed, and a test of peeling the lattice-shaped notch portion by using an adhesive tape was performed.

(3) Evaluation Results

The results of the above-mentioned evaluation test 1 are shown in Table 1 below. Table 1 shows evaluation results of the durability of adhesive force of various plastic lenses 1 provided with various base materials 10 different in refractive indices, which shows the evaluation results of the crosshatch test, before the accelerated treatment (in the initial state), after a 40-hour accelerated treatment and after a 168-hour accelerated treatment. Meanwhile, numerical values listed in respective columns regarding the accelerated treatment period of time in Table 1 show the ratio (%) of area in which no film peeling is generated after the crosshatch test.

TABLE 1

| REFRACTIVE INDEX OF BASE MATERIAL | ACCELERATED TREATMENT PERIOD OF TIME | | |
|---|---|---|---|
| | INITIAL STATE | 40 h | 168 h |
| 1.50 | 100 | 99 | 97 |
| 1.55 | 100 | 85 | 81 |
| 1.60 | 100 | 99 | 93 |
| 1.67 | 100 | 99 | 98 |
| 1.70 | 100 | 99 | 97 |

As shown in Table 1, in the plastic lenses 1 of this example, in the initial state before the accelerated treatment, the ratio of the area of the part where no film peeling was generated was 100%, irrespective of the kind (refractive index) of the base material 10, and no film peeling was observed. Furthermore, in the plastic lenses 1 of this example, even after the 40-hour and 168-hour accelerated treatments, the film peeling was not generated at a rate of not less than 80%, irrespective of the kind (refractive index) of the base material 10. It was known that, in particular, in plastic lenses 1 other than the plastic lens 1 using the base material 10 having a refractive index of 1.55, the film peeling was not generated at a very high rate of not less than 90%.

(4) COMPARATIVE EXAMPLE 1

Here, in order to make comparisons with the evaluation results of the plastic lenses 1 in Example 1 shown in Table 1, there was produced a plastic lens in which an antireflection film not provided with the electrically conductive layer was directly provided on the base material (Comparative Example 1), and also for the plastic lens in Comparative Example 1, the adhesive force of the antireflection film to the base material 10 and the durability thereof were evaluated in the same way as that in Example 1 (evaluation test 1).

Figure 2:
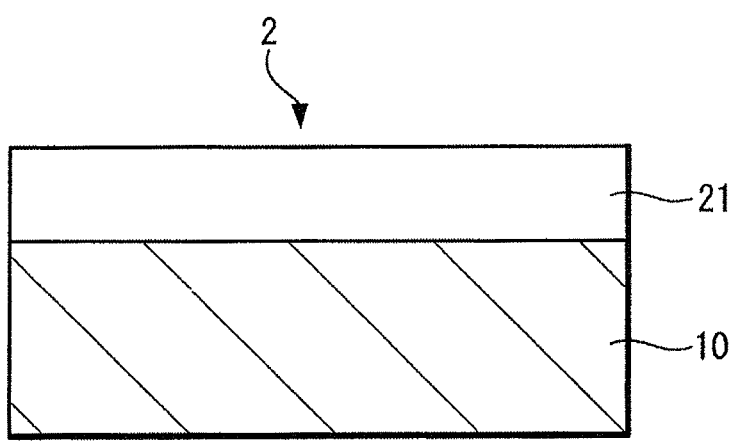
FIG. 2 is a schematic cross-sectional view of a plastic lens in Comparative Example 1.

In FIG. 2, a schematic cross-sectional view of a plastic lens 2 in Comparative Example 1 is shown. Meanwhile, in the plastic lens 2 in Comparative Example 1 shown in FIG. 2, the same configuration as that of the plastic lens 1 in the above-mentioned embodiment (Example 1) shown in FIG. 1 is shown with the same reference sign.

The plastic lens 2 in Comparative Example 1 includes the base material 10 and an antireflection film 21 formed in contact with the base material 10. Meanwhile, as the base material 10, the base material 10 having a refractive index of 1.50, 1.55, 1.60, 1.67 or 1.70 is used, in the same way as that in Example 1. Furthermore, in Comparative Example 1, the antireflection film 21 is constituted by a multilayer film in which each of seven $SiO_2$ layers and each of seven $ZrO_2$ layers are stuck alternately. That is, the antireflection film 21 in Comparative Example 1 has the same configuration as that of the antireflection film main body 12 in Example 1. Meanwhile, in Comparative Example 1, the base material 10 was cleaned in the same way as that in Example 1, and after that, on the base material 10, the formation of the antireflection film 21 by using a vacuum evaporation method produces various plastic lenses 2.

The results of accelerated weathering tests performed on various plastic lenses 2 having the above-mentioned configuration in Comparative Example 1 are shown in Table 2 below.

TABLE 2

| REFRACTIVE INDEX OF BASE MATERIAL | ACCELERATED TREATMENT PERIOD OF TIME | | |
|---|---|---|---|
| | INITIAL STATE | 40 h | 168 h |
| 1.50 | 100 | 0 | 0 |
| 1.55 | 100 | 1 | 0 |
| 1.60 | 100 | 99 | 90 |
| 1.67 | 100 | 7 | 0 |
| 1.70 | 100 | 1 | 0 |

As shown in Table 2, in Comparative Example 1, in the initial state before the accelerated treatment, in the same way as that in Example 1, the ratio of the area of the part where no film peeling was generated was 100%, irrespective of the kind (refractive index) of the base material 10, and no film peeling was observed.

However, after the 40-hour accelerated treatment, in plastic lenses 2 other than the plastic lens 2 using the base material 10 having a refractive index of 1.60, the film peeling was generated at a rate of not less than 90%. Furthermore, after the 168-hour accelerated treatment, in plastic lenses 2 other than the plastic lens 2 using the base material 10 having a refractive index of 1.60, the ratio of the area of the part where no film peeling was generated was 0%, that is, the film peeling was generated at a rate of 100%.

Moreover, also in the plastic lens 2 using the base material 10 having a refractive index of 1.60, after the 168-hour accelerated treatment, the ratio of the area of the part where no film peeling was generated was 90%, which was smaller than the ratio (93%) in the plastic lens 1 using the base material 10 having a refractive index of 1.60 in the above-mentioned Example 1. That is, it was known that, even in the plastic lens 2 using the base material 10 having a refractive index of 1.60 in Comparative Example 1, the durability of the antireflection film became lower than that of the plastic lens 1 corresponding to in Example 1.

From the results of the evaluation test 1 described above (Tables 1 and 2), it is known that, with the electrically conductive layer 13 being provided on the surface of the antireflection film 11 on the base material 10 side as is the case for Example 1, the adhesiveness and durability at the interface between the base material 10 and the antireflection film 11 are enhanced.

Meanwhile, since the film configuration of the plastic lens 1 in Example 1 and the film configuration of the plastic lens 2 in Comparative Example 1 are different from each other, film stresses acting on each of the plastic lenses are different between both. However, relative to the film stress in the plastic lens 1 in Comparative Example 1, the change in the film stress generated when the thin electrically conductive layer 13 having a thickness of approximately 10 nm is added between the antireflection film main body 12 and the base material 10 as in Example 1 is approximately −3%. The amount of change in the film stress is approximately the error in film stress between samples of plastic lenses 1. Accordingly, it is difficult to explain the difference in the durability of adhesive force of the antireflection film between Example 1 and Comparative Example 1 on the basis of the difference in film stresses of both.

EXAMPLE 2 AND EVALUATION TEST 2

In the plastic lens 1 in Example 2, the electrically conductive layer 13 was constituted by a transparent electrically conductive film containing ZnO having a thickness of approximately 10 nm. Configurations other than this (refractive index of the base material 10 and the like) were the same as those in the above-mentioned Example 1. Meanwhile, the surface resistance of the electrically conductive layer 13 in this example was approximately $2 \times 10^8 \Omega$.

In the evaluation test 2, in the same way as that in the above-mentioned evaluation test 1, the adhesive force of the antireflection film 11 and the durability thereof (ultraviolet ray durability), in various plastic lenses 1 in Example 2 were evaluated.

In Table 3 below, results of the evaluation test 2 are shown. Meanwhile, in Table 3, evaluation results after the 168-hour accelerated treatment are shown. Furthermore, in Table 3, for comparison, results of the above-mentioned evaluation test 2 performed on plastic lenses 2 having the same configuration as that in the above-mentioned Comparative Example 1 are shown together (column of $SiO_2$ in Table 3). However, the samples in Comparative Example 1 shown in Table 3 are different from the samples in Comparative Example 1 shown in Table 2.

TABLE 3

| | 169 H-ACCELERATED TREATMENT | |
|---|---|---|
| REFRACTIVE INDEX OF BASE MATERIAL | $SiO_2$ (COMPARATIVE EXAMPLE 1) | ZnO (EXAMPLE 2) |
| 1.50 | 3 | 13 |
| 1.55 | 1 | 67 |
| 1.60 | 97 | 97 |
| 1.67 | 9 | 10 |
| 1.70 | 1 | 99 |

As is clear from Table 3, it was known that, also in the case where the electrically conductive layer 13 was constituted by a transparent electrode film containing ZnO, the adhesiveness at the interface between the base material 10 and the antireflection film 11 and the durability were enhanced as compared with Comparative Example 1. Therefore, from the above-mentioned evaluation tests 1 and 2, the enhancement (improvement) effect of the adhesive force of the antireflection film 11 on the base material 10 described above and the durability thereof are considered to be due to the electrically conductive property of the electrically conductive layer.

[Evaluation Test 3]

In an evaluation test 3, there was evaluated difference in the adhesiveness between the case where a hard coat was provided between the antireflection film and the base material and the case where no hard coat was provided.

(1) Comparative Example 3 (Without a Hard Coat) and Comparative Example 4 (With a Hard Coat)

In order to perform the above-mentioned evaluation, in Comparative Example 3, there were produced various plastic lenses using a $SiO_2$ film, an $Al_2O_3$ film, a $ZrO_2$ film, a $Ta_2O_5$ film or a $Nb_2O_5$ film as the adhesive layer in place of the electrically conductive layer 13, in the plastic lens 1 in the above-mentioned Example 1 (FIG. 1).

Furthermore, here, there were produced various plastic lenses in which a hard coat layer was newly provided between the antireflection film and the base material, in various plastic lenses in the above-mentioned Comparative Example 3 (Comparative Example 4). Meanwhile, in Comparative Examples 3 and 4, as the base material 10, the base material of refractive index of 1.50 was used.

(2) Evaluation Test 3

In the evaluation test 3, in the same way as that in the above-mentioned evaluation test 1, there was performed the evaluation of adhesive force of the antireflection film and the durability thereof (ultraviolet ray durability), in various plastic lenses in Comparative Examples 3 and 4. The evaluation results are shown in Tables 4 and 5 below.

In Table 4, the evaluation results after the 168-hour accelerated treatment performed on various plastic lenses in Comparative Example 3 are shown. Meanwhile, in Table 4, for comparison, the evaluation results of the plastic lens 1 using the base material 10 having a refractive index of 1.50 in the above-mentioned Example 1 is shown together (the column of ITO in Table 4). Furthermore, in Table 5, the evaluation results after the 168-hour accelerated treatment performed on various plastic lenses in Comparative Example 4 are shown.

TABLE 4

| WITHOUT HC | $SiO_2$ | $Al_2O_3$ | $ZrO_2$ | $Ta_2O_5$ | $Nb_2O_5$ | ITO |
|---|---|---|---|---|---|---|
| INITIAL STATE | 99 | 92 | 99 | 95 | 98 | 99 |
| AFTER ACCELERATED TREATMENT | 0 | 24 | 20 | 3 | 7 | 97 |

TABLE 5

| WITH HC | $SiO_2$ | $Al_2O_3$ | $ZrO_2$ | $Ta_2O_5$ | $Nb_2O_5$ |
|---|---|---|---|---|---|
| INITIAL STATE | 99 | 85 | 99 | 99 | 99 |
| AFTER ACCELERATED TREATMENT | 98 | 54 | 96 | 97 | 98 |

As is clear from Table 4, in the plastic lenses in Comparative Example 3 not provided with a hard coat, after the accelerated treatment, the film peeling of the antireflection film was remarkably generated. That is, it was known that, when a $SiO_2$ film, an $Al_2O_3$ film, a $ZrO_2$ film, a $Ta_2O_5$ film or a $Nb_2O_5$ film having no electroconductivity was used as the adhesive layer, the durability of the adhesive force of the antireflection film to the base material was not able to be obtained.

However, as shown in Table 5, even in the case where a film having no electroconductivity is used as the adhesive layer, the durability of the adhesive force of the antireflection film is obtained with a hard coat being provided. That is, from the results of Tables 4 and 5, it is known that, when a $SiO_2$ film, an $Al_2O_3$ film, a $ZrO_2$ film, a $Ta_2O_5$ film or a $Nb_2O_5$ film having no electroconductivity is used as the adhesive layer, an antireflection film having the durability for ultraviolet rays can not be obtained if a hard coat is not provided.

In contrast, it is known that, when a film having electroconductivity (an ITO film) is used as the adhesive layer as in the above-mentioned Example 1, as shown in Table 4, the film peeling is hardly generated after the accelerated treatment even when a hard coat is not provided and the durability of the adhesive force of the antireflection film 11 to the base material 10 is enhanced (improved).

Also from the above-mentioned evaluation test 3, it is known that, with an electrically conductive film being provided on the surface of the antireflection film 11 on the base material 10 side, the adhesiveness at the interface between the base material 10 and the antireflection film 11 and the durability are enhanced (improved).

[Evaluation Test 4]

In the above-mentioned Patent Literature 1, there is proposed the technology in which a metal thin film having thickness of approximately 2 nm is provided as an adhesive layer at the interface between the base material and the antireflection film. However, the material of the adhesive layer used in Patent Literature 1 is a colored material having an absorption band in visible light. In optical lenses for use in an optical system such as a camera, the effect of absorption of visible light component in a metal thin film can be neglected, but in the case of spectacle lenses for which visual transparency (colorless transparency) is required, such a colored adhesive layer can not be utilized.

Accordingly, in the evaluation test 4, the evaluation was performed on optical characteristics of the plastic lens 1 produced in the above-mentioned Example 1. Specifically, there were examined transmission characteristics in visible light band of the plastic lens 1 in Example 1 in which the electrically conductive layer 13 (adhesive layer) was constituted by an ITO film having a thickness of 10 nm. Meanwhile, the base material 10 was constituted by the base material having a refractive index of 1.50, and the antireflection film main body 12 was constituted by a multilayer film in which each of seven $SiO_2$ layers and each of seven $ZrO_2$ layers were stuck alternately.

Furthermore, in the evaluation test 4, for comparison, there was produced a plastic lens provided with a Ti thin film having a thickness of 2 nm (metal thin film), as the adhesive layer, at the interface between the base material and the antireflection film (Comparative Example 5), and for the plastic lens in Comparative Example 5, transmittance characteristics in the visible light band were examined in the same way.

Meanwhile, the transmittance of respective plastic lenses was measured using a spectrophotometer U-4100 (manufactured by Hitachi, Ltd). In addition, in the transmittance measurement, the true transmittance T* was obtained by elimination of the influence of reflectivity. The true transmittance T* was calculated from a measured value T of the transmittance and a measured value R of the reflectivity, by using a calculation formula $T^*=T/(1-R)$.

In FIG. 3, the evaluation results of transmittance characteristics described above are shown. Meanwhile, the characteristics shown in FIG. 3 are transmittance spectra of plastic lenses in the above-mentioned Example 1 and Comparative Example 5 in the visible light band, and the horizontal axis shows the wavelength and the vertical axis shows the true transmittance $T^*$. The characteristic shown by a thick solid line in FIG. 3 is the transmittance spectrum of the plastic lens 1 in Example 1, and the characteristic shown by a thick broken line in FIG. 3 is the transmittance spectrum of the plastic lens in Comparative Example 5.

As is clear from FIG. 3, it is known that the plastic lens 1 in Example 1 gives higher transmittance than in Comparative Example 5, in the visible light band. Specifically, in the plastic lens in Comparative Example 5, the average value of the transmittance in the visible light band is 95.6%, and it was confirmed visually that the lens was slightly black-colored. In contrast, in the plastic lens 1 in Example 1, the average value of the transmittance in the visible light band was 98.8%, to give high transparency. Furthermore, as the result of checking visually the transparency of the plastic lens 1 in Example 1, it was confirmed that the colorless transparent plastic lens 1 was obtained.

From the result of the above-mentioned evaluation test 4, it is known that, in the plastic lens 1 in Example 1, not only the adhesiveness at the interface between the base material 10 and the antireflection film 11 and the durability can be enhanced (improved) but also the colorless transparency of the lens can be ensured. Therefore, the plastic lens 1 in Example 1 is favorable as a spectacle lens.

From the results of various Examples and various evaluation tests described above, the adhesiveness at the interface between the base material 10 and the antireflection film and the durability can be enhanced with the electrically conductive layer 13 made of a transparent electrically conductive film being provided on the surface of the antireflection film 11 on the base material 10 side (contact surface), as the plastic lenses 1 of the above-mentioned embodiments (various Examples) with the configuration shown in FIG. 1. Furthermore, in the plastic lenses 1 of the above-mentioned embodiments (various Examples), since the provision of a hard coat is unnecessary, the plastic lens 1 can be produced at a low cost. That is, in the above-mentioned embodiments (various Examples), plastic lenses of good quality can be produced at a lower cost.

REFERENCE SIGNS LIST

1: plastic lens, 10: base material, 11: antireflection film, 12: antireflection film main body, 13: electrically conductive layer

The invention claimed is:

1. A plastic lens, comprising: a plastic base material; and an antireflection film having an electrically conductive layer that is deposited on a surface of the plastic base material and that has colorless transparency, and an antireflection film main body that contains a metal oxide, formed on the electrically conductive layer.

2. The plastic lens according to claim 1, wherein the electrically conductive layer contains an oxide of at least one element among indium, tin, zinc and titanium.

3. The plastic lens according to claim 1, wherein the plastic base material is formed of any of materials of allyl resin, urethane resin, polysulfide resin and polycarbonate resin.

4. The plastic lens according to claim 2, wherein the plastic base material is formed of any of materials of allyl resin, urethane resin, polysulfide resin and polycarbonate resin.

5. The plastic lens according to claim 1, wherein the antireflection film main body is formed in contact with the electrically conductive layer.

6. The plastic lens according to claim 1, wherein the electrically conductive layer is formed of inorganic material.

7. A plastic lens, comprising: a plastic base material; and an antireflection film having an electrically conductive layer that is formed in direct contact with a surface of the plastic base material and that has colorless transparency, and an antireflection film main body that contains a metal oxide, formed on the electrically conductive layer.

8. The plastic lens according to claim 7, wherein the electrically conductive layer contains an oxide of at least one element among indium, tin, zinc and titanium.

9. The plastic lens according to claim 7, wherein the plastic base material is formed of any of materials of allyl resin, urethane resin, polysulfide resin and polycarbonate resin.

10. The plastic lens according to claim 8, wherein the plastic base material is formed of any of materials of allyl resin, urethane resin, polysulfide resin and polycarbonate resin.

11. The plastic lens according to claim 7, wherein the antireflection film main body is formed in contact with the electrically conductive layer.

12. The plastic lens according to claim 7, wherein the electrically conductive layer is formed of inorganic material.

* * * * *